United States Patent [19]
Nakahara et al.

[11] Patent Number: 5,563,465
[45] Date of Patent: Oct. 8, 1996

[54] ACTUATOR

[75] Inventors: Hitoshi Nakahara, Kokubunji; Masakazu Ichikawa, Setagaya-ku; Yuishin Tanaka, Sayama; Sakae Saitou, Tokorozawa; Shigeo Moriyama, Tama, all of Japan

[73] Assignee: Hitachi, Ltd., Tokyo, Japan

[21] Appl. No.: 225,978

[22] Filed: Apr. 12, 1994

[30] Foreign Application Priority Data

Apr. 14, 1993 [JP] Japan .................. 5-087108

[51] Int. Cl.⁶ ............................ H02N 2/00; H01L 41/08
[52] U.S. Cl. .............................. 310/328; 310/317
[58] Field of Search ........................ 310/317, 328, 310/323

[56] References Cited

U.S. PATENT DOCUMENTS

| | | | |
|---|---|---|---|
| 3,902,084 | 8/1975 | May | 310/317 |
| 4,613,782 | 9/1986 | Mori et al. | 310/323 |
| 4,950,135 | 8/1990 | Tojo et al. | 310/323 |
| 4,997,177 | 3/1991 | Mori et al. | 271/267 |
| 5,013,958 | 5/1991 | Ohnishi et al. | 310/323 |
| 5,071,113 | 12/1991 | Nakamura et al. | 271/267 |
| 5,073,912 | 12/1991 | Kobayashi et al. | 378/34 |
| 5,089,740 | 2/1992 | Ono | 310/328 |
| 5,198,935 | 3/1993 | Imanari et al. | 359/698 |

FOREIGN PATENT DOCUMENTS

| | | | |
|---|---|---|---|
| 60-200776 | 10/1985 | Japan | H02N 2/00 |
| 62-64276 | 3/1987 | Japan | H02N 2/00 |
| 0058883 | 3/1987 | Japan | 310/328 |
| 62-58883 | 3/1987 | Japan | 310/328 |
| 1-16272 | 1/1989 | Japan | H02N 2/00 |
| 63-63374 | 9/1989 | Japan | 310/328 |
| 0238470 | 9/1989 | Japan | 310/328 |
| 0119577 | 5/1990 | Japan | 310/328 |
| 0681479 | 4/1978 | U.S.S.R. | 310/328 |
| 0760247 | 12/1978 | U.S.S.R. | 310/317 |
| 0771773 | 1/1979 | U.S.S.R. | 310/317 |

Primary Examiner—Thomas M. Dougherty
Attorney, Agent, or Firm—Fay, Sharpe, Beall, Fagan, Minnich & McKee

[57] ABSTRACT

An actuator includes piezo electric devices which are installed in contact with a drive head and a driven body which is contact-driven by the drive head. Thus, only one mechanism performs coarse motion and micromotion by forming a gap between the drive head and driven body. The high precision positioning mechanism can be miniaturized and constructed at a low price.

16 Claims, 8 Drawing Sheets

1,2... PIEZO ELECTRIC DEVICE

3... DRIVE HEAD

4... DRIVEN BODY

ACTUATOR

BACKGROUND OF THE INVENTION

The present invention relates to an actuator for a transfer stage for performing a wide range of transfer motion with submicron accuracy at high speed.

A conventional method for driving a stage in combination with a piezo electric device is described in Japanese Patent Application Laid-Open No. 62-58883.

An example of this conventional actuator is shown in FIG. 2. In the conventional actuator, a drive head 3 is always pressed against a driven body 4 by an elastic body 7.

To piezo electric devices 1 and 2, a sine wave voltage which matches with the resonance frequency that is a function of the stiffness of the piezo electric devices is applied from a power source connected to the piezo electric devices 1 and 2. In this case, the phases of the voltages applied to the piezo electric devices 1 and 2 are shifted by 90°. By doing this, since the piezo electric devices 1 and 2 move independently, the drive head 3 which is in contact with the two piezo electric devices traces an elliptical orbit. By setting the elastic force of the above elastic body so that the resonance frequency determined by the elastic force of the elastic body 7 matches with the frequency applied to the above piezo electric devices, the driven body 4 can be moved in one direction by the drive head 3 tracing the above elliptical orbit. By setting the above phase difference to −90°, the rotational direction of the above elliptical orbit can be reversed and the movement direction can be reversed.

However, since the above conventional method uses the resonance of the piezo electric devices, the speed with which the body 4 can be driven is limited to the intrinsic frequency determined by the stiffness of the above pair of piezo electric devices. Furthermore, since the method uses a stationary wave for driving, it is difficult to perform fine adjustment such as transfer at different voltage periods. The conventional method cannot be used as a fine transfer mechanism due to these restrictions and it is thus necessary to install a fine transfer mechanism separately.

SUMMARY OF THE INVENTION

An object of the present invention is to provide an actuator for a transfer stage for performing a wide range of transfer motion with submicron accuracy at high speed.

The actuator of the present invention comprises a drive head which is in contact with at least two piezo electric devices, and a driven body which is contact-driven by the drive head.

To accomplish the above object, according to the present invention, when no voltage is applied to the piezo electric devices, a gap is formed between the drive head and driven body.

The above piezo electric devices are formed in different stretch directions respectively on the plane containing the driving direction and the normal line at the contact point of the driven body and drive head.

When the smaller of the angles between the normal line at the above contact point for a plurality of piezo electric devices and the stretch directions of the above piezo electric devices is assumed as θ, the drive head surfaces of the above pair of piezo electric devices and another head are fixed on a base 5 so that a gap of about $(\cos \theta)/2$ of the maximum stretch of the piezo electric device having a smaller angle between the above normal direction and stretch direction is provided between the above drive head surface and the driven surface of the above driven body when no voltage is applied to all the piezo electric devices, and a drive voltage having a period lower than the resonance frequency determined by the stiffness of the above pair of piezo electric devices is applied to the above piezo electric devices.

FIG. 3 shows an example in which the stretch directions of the piezo electric devices 1 and 2 are inclined to the normal line at the contact point of the drive head 3 and the driven body 4 at +45° and −45° respectively. The piezo electric devices 1 and 2 show a maximum stretch of L when a maximum voltage of $V_{max}$ is applied to them. When no voltage is applied to the piezo electric devices 1 and 2, there is a gap of almost $((\cos 45°)/2)=(\sqrt{2}/4)L$ between the drive head 3 and the driven body 4 (FIG. 3(a)). When 0.5 $V_{max}$ is applied to the piezo electric devices 1 and 2, the drive head 3 comes in contact with the driven body (FIG. 3(b)).

Next, when the voltage of the piezo electric device 1 is reduced to 0 and the voltage of the piezo electric device 2 is increased to $V_{max}$, the drive head 3 transfers to the piezo electric device 1 together with the driven body 4 (FIG. 3(c)). When the voltage of the piezo electric device 2 is reduced thereafter, the drive head 3 separates from the driven body 4 (FIG. 3(d)). When the voltage of the piezo electric device 2 is reduced to 0, the drive head 3 returns to the original position (FIG. 3(a)). Since the drive head 3 and the driven body 4 are installed so that there is a gap provided between them when the voltages of the piezo electric devices 1 and 2 are 0, the above voltage application procedure can be repeated at an optional speed and in an optional period at a frequency of at most the resonance frequency determined by the stiffness of the piezo electric devices.

At a frequency greater than the above resonance frequency determined by the stiffness of the piezo electric devices, the stretch of the above piezo electric devices cannot follow the voltage change, so that the upper limit of the voltage period to be applied is the above resonance frequency. According to the present invention, the transfer speed of the driven body may have continuous values from the above resonance frequency to the lower limit of the period ∞, that is, the stop state, which cannot be realized by the prior art. By changing the period and/or the waveform of voltage to be applied according to the distance to the target position, a most suitable drive condition can be obtained.

The stretch directions of the piezo electric devices 1 and 2 shown in FIG. 3 are inclined to the normal line at the contact point of the drive head 3 and the driven body 4 at +45° and −45° respectively. As long as the two piezo electric devices do not have the same stretch direction, the angle to the above normal is optional. The above two piezo electric devices have almost the same characteristics. However, they may have different characteristics.

In this case, when the above two piezo electric devices are not located symmetrically, if the driving direction is reversed, the drive characteristics are changed and the control becomes complicated. When the stretch directions of the above two piezo electric devices are not orthogonal, the stretches interfere with each other and the control also becomes difficult. Unless piezo electric devices having exactly the same characteristics are used, a variation of about 10% of voltage-stretch characteristics cannot be avoided in actual piezo electric devices.

To correct the above variation of characteristics, by installing a mechanism for adjusting the absolute value of the voltage to be applied to each of the above piezo electric devices independently, stable driving with high precision can be performed.

The upper limit of driving speed and drive precision depend on the type of piezo electric devices to be used and on the power precision. The maximum stretch of a layer type piezo electric device which is generally used is about 10 microns and the self-resonance frequency is several tens KHz. The stability of a power source with moderate precision is about 1/1000. In this case, the upper limit of driving speed is several tens cm per second and the drive precision is about 10 nm. By using piezo electric devices having a long maximum stretch when the driving speed is given priority or by using piezo electric devices having a short maximum stretch when the drive precision is given priority, the present invention can offer a wide range of applications.

DETAILED DESCRIPTION OF THE PREFERRED EMBODIMENTS

The preferred embodiments of the present invention will be explained with reference to the accompanying drawings.

Figure 1:
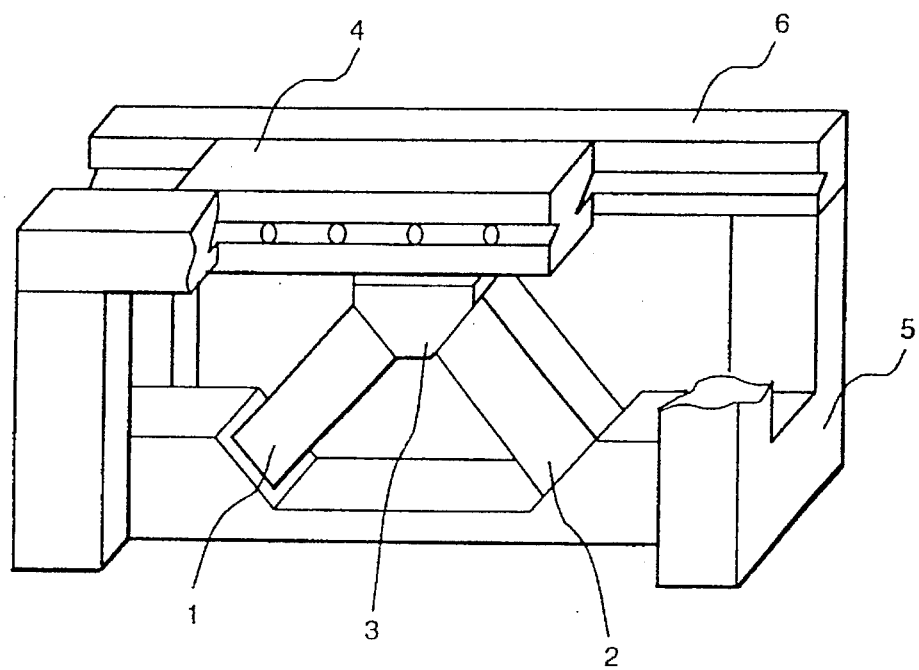
FIGS. 1a–1b an embodiment of the actuator of the present invention and outputs.
Figure 1:
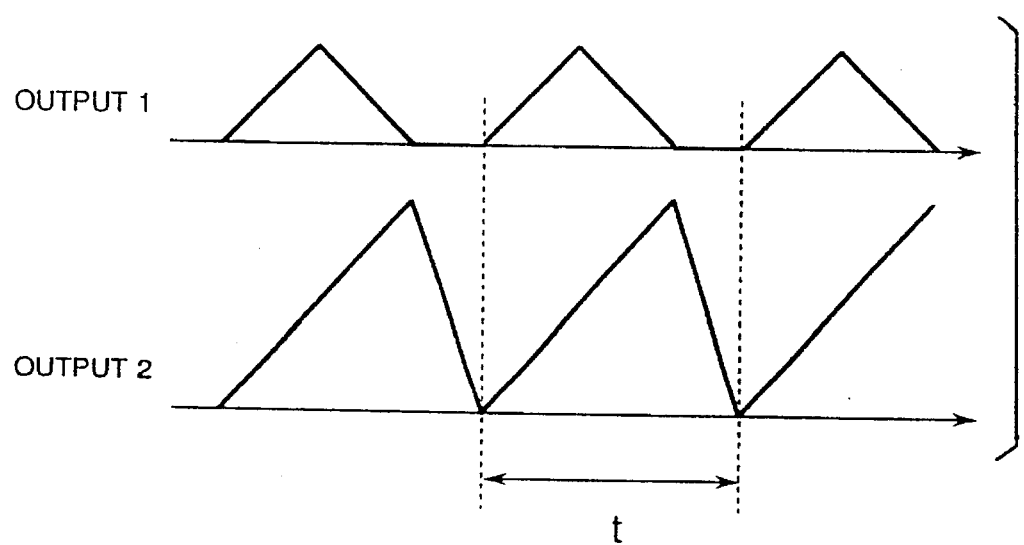
Figure 2:
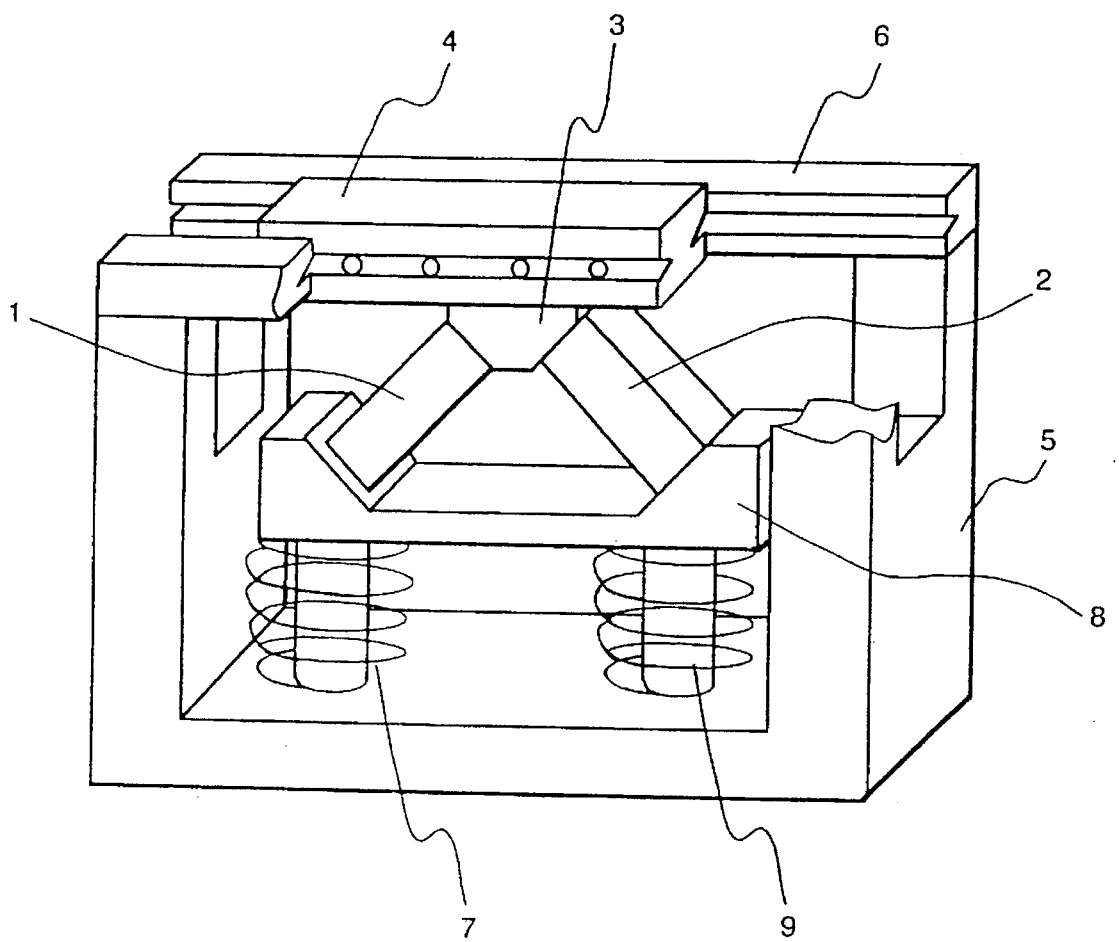
FIG. 2 shows an actuator of the prior art.
Figure 3:
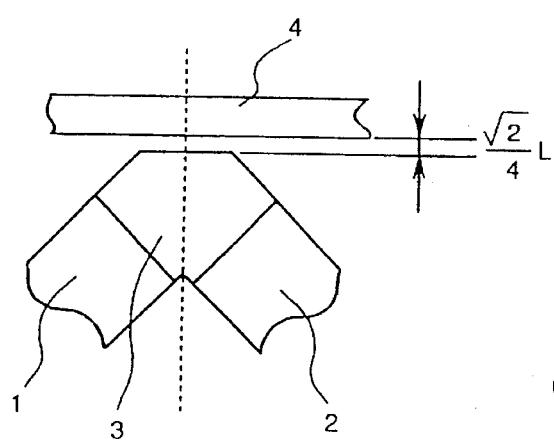
FIGS. 3a–3d illustrates the operation of an actuator constructed according to the present invention.
Figure 3:
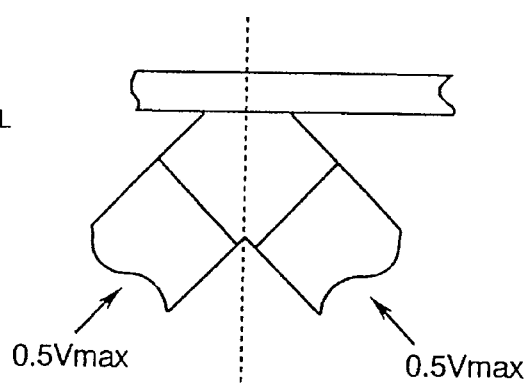
Figure 3:
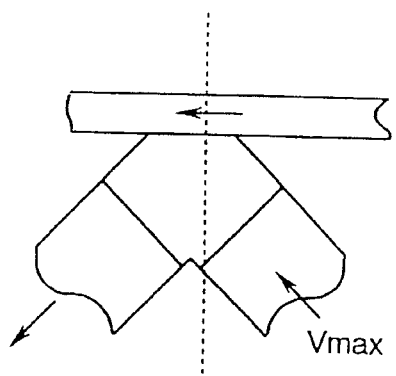
Figure 3:
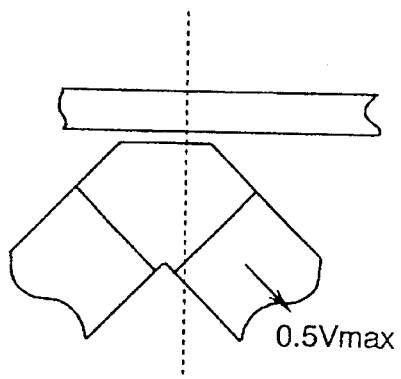

FIG. 1(a) shows a simple embodiment of the present invention. There is a gap of almost $\sqrt{2}/4$ of the maximum stretch L of piezo electric devices 1 and 2 between a drive head 3 and a driven body 4. Since the maximum stretch of a piezo electric device is generally about 10 microns, the gap is about 3 microns in width. The driven body 4 is constrained so as move linearly against with reference to a base 5 by a linear guide 6.

FIG. 1(b) shows voltage waveforms to be applied to the above piezo electric devices 1 and 2. When output 1 is applied to the piezo electric device 1 and output 2 to the piezo electric device 2, the driven body 4 transfers to the right in the drawing. The output voltage period t is an optional value, of at most the period which is determined by the resonance frequency which is a function of the stiffness of the above piezo electric devices.

Figure 4:
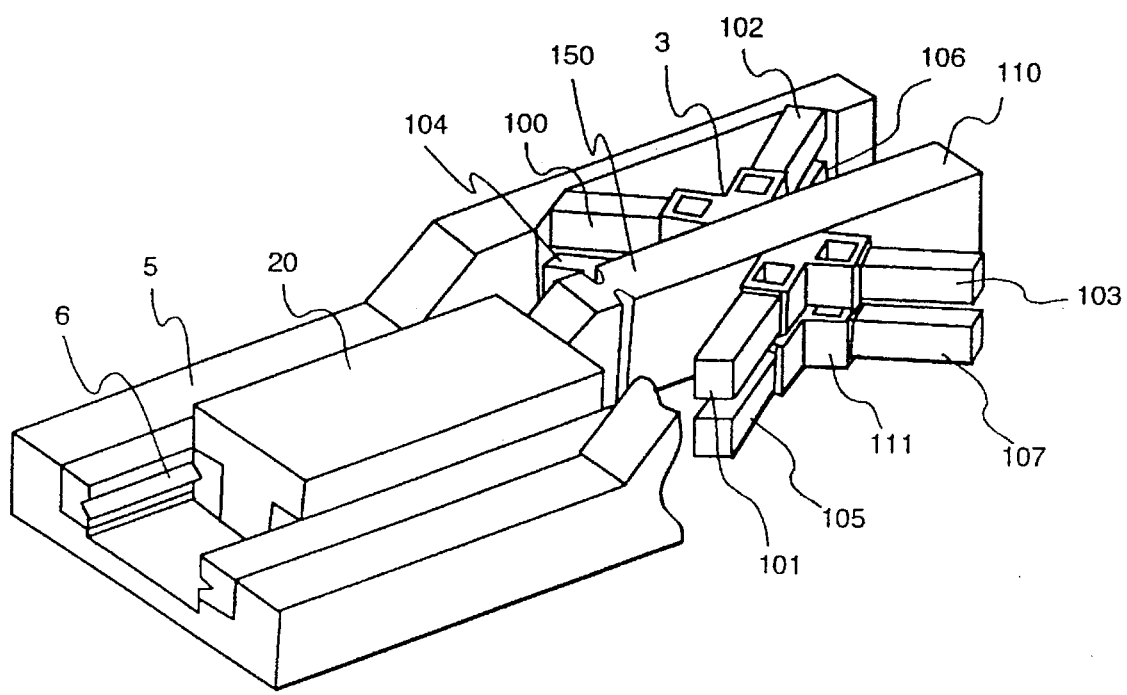
FIG. 4 shows another embodiment of the actuator of the present invention.

FIG. 4 is a drawing showing another embodiment of the present invention. In this embodiment, a driving rod 110 which transfers together with a stage 20 is driven by four pairs of piezo electric devices 100 and 102, 101 and 103, 104 and 106, and 105 and 107. The above pairs of piezo electric devices are arranged at intervals of several microns from the above driving rod. To relieve the distortion applied to the piezo electric devices during driving, a soft structure 111 comprising of parallel plate springs is installed between each piezo electric device and the drive head 3. To ensure stable driving even if the gaps between the above driving rod 110 and the left and right pairs of piezo electric devices are slightly unbalanced, a soft structure 150 comprising notches is installed between the above driving rod and the above stage 20. Examples of applied voltage waveforms for driving a mechanism of the structure shown in this embodiment are shown in FIGS. 5 to 7.

Figure 5:
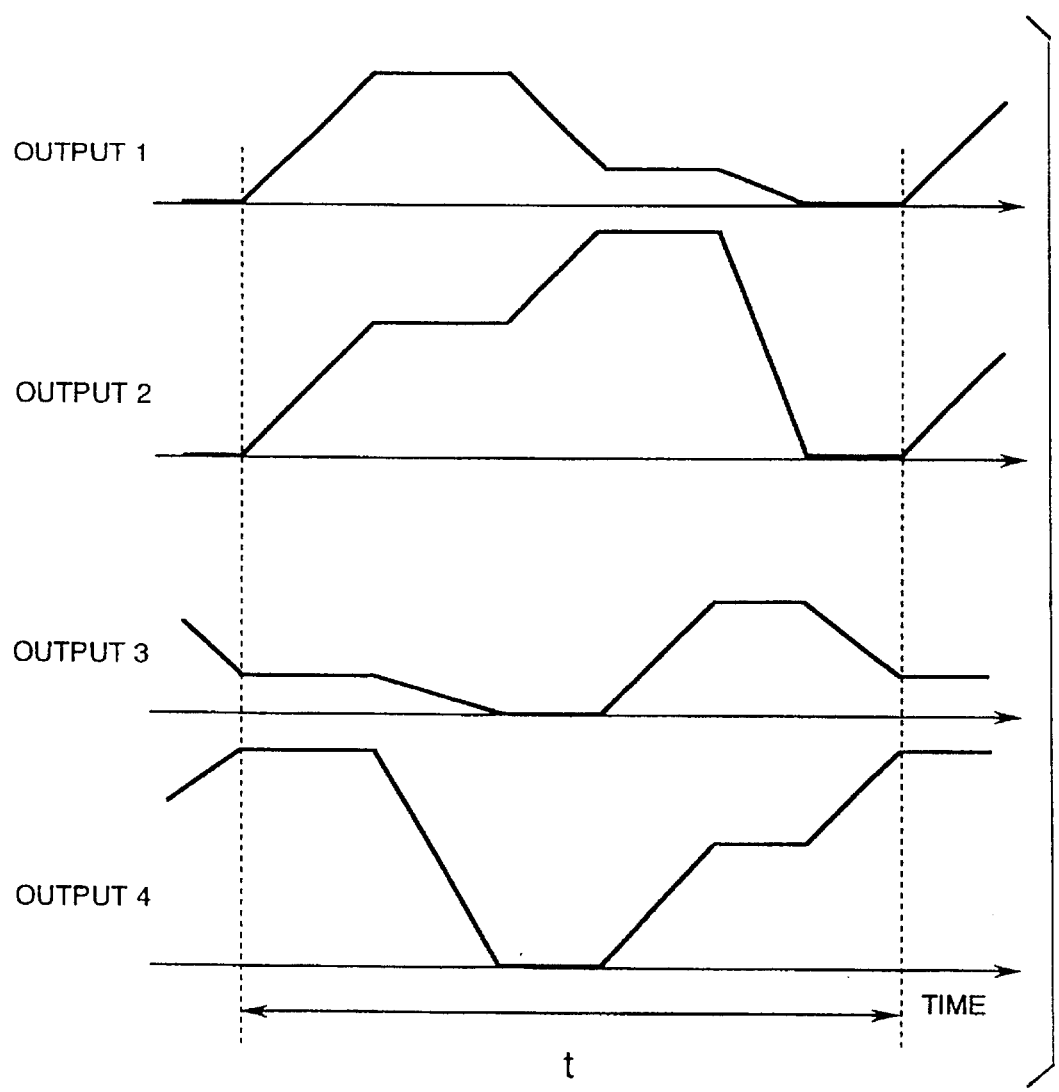
FIG. 5 shows an example of the voltage waveform which is applied to a piezo electric device so as to drive the actuator of the present invention.

FIG. 5 shows an example of drive voltages. For driving at a moderate speed. Output 1 indicates a voltage to be outputted to the piezo electric devices 100 and 101, output 2 a voltage to be outputted to the piezo electric devices 102 and 103, output 3 a voltage to be outputted to the piezo electric devices 104 and 105, and output 4 a voltage to be outputted to the piezo electric devices 106 and 107. In this embodiment, the pairs of piezo electric devices on the upper side which comprises of the piezo electric devices 100 to 103 and the pairs of piezo electric devices on the lower side which comprises of the piezo electric devices 104 to 107, drive the driving rod 110 alternately. When the output 1 and output 2 are interchanged with the output 3 and output 4 respectively, the driving direction can be reversed.

Figure 6:
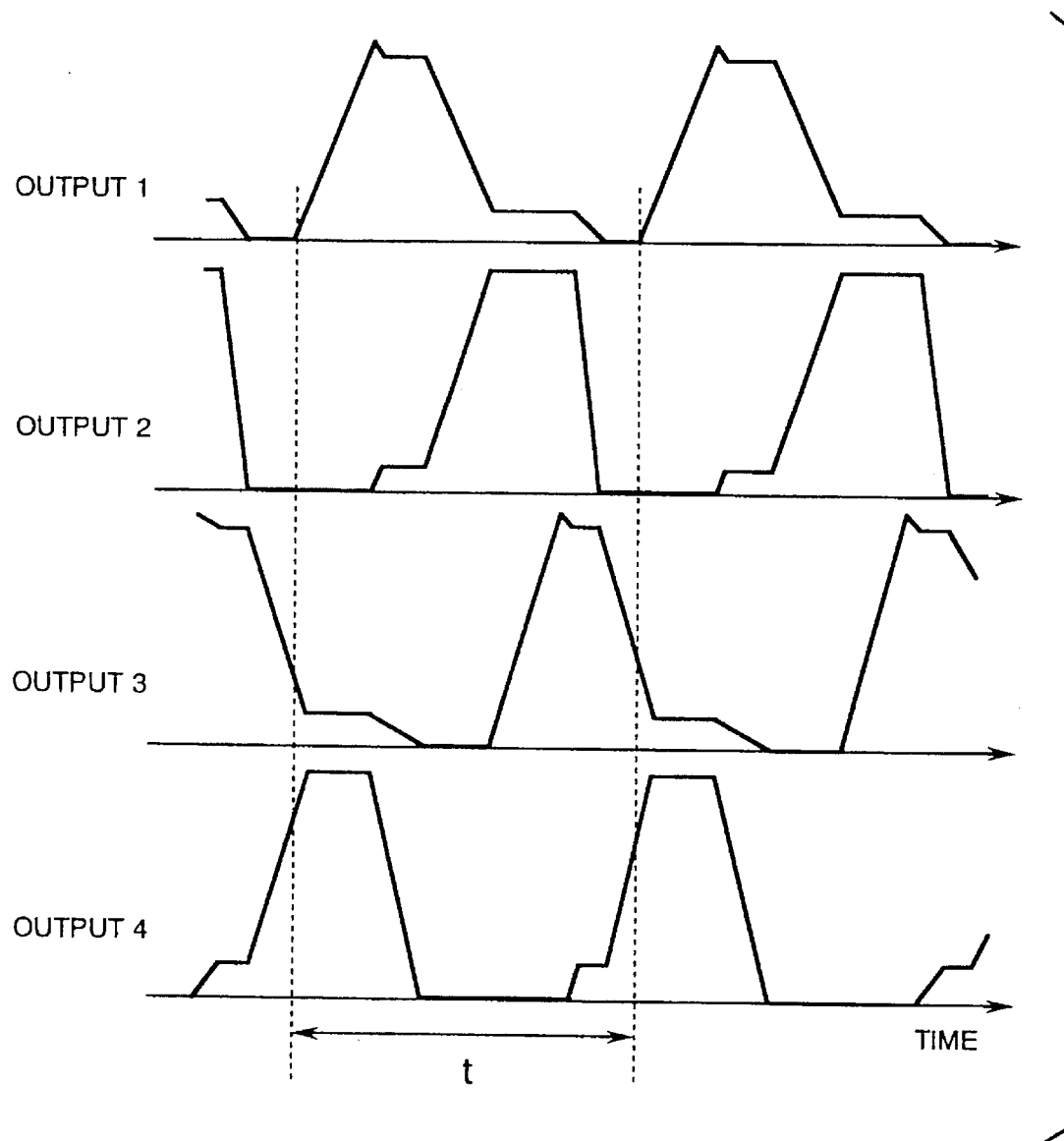
FIG. 6 shows another example of a voltage waveform which is applied to a piezo electric device so as to drive the actuator of the present invention.

FIG. 6 shows an example of drive voltages for driving the stage 20 at a comparatively high speed. The pairs of piezo electric devices on the upper side and the pairs of piezo electric devices on the lower side drive the driving rod 110 alternately in the same way as with the example shown in FIG. 5. However, the driving amount per period is almost two times that of the FIG. 5 example: thus, this method is suitable for high speed driving. Since the phases for driving by the pairs of piezo electric devices on the upper side and the pairs of piezo electric devices on the lower side are overlapped for speeding up in this embodiment, the drive precision is slightly lower than that shown in FIG. 5.

Figure 7:
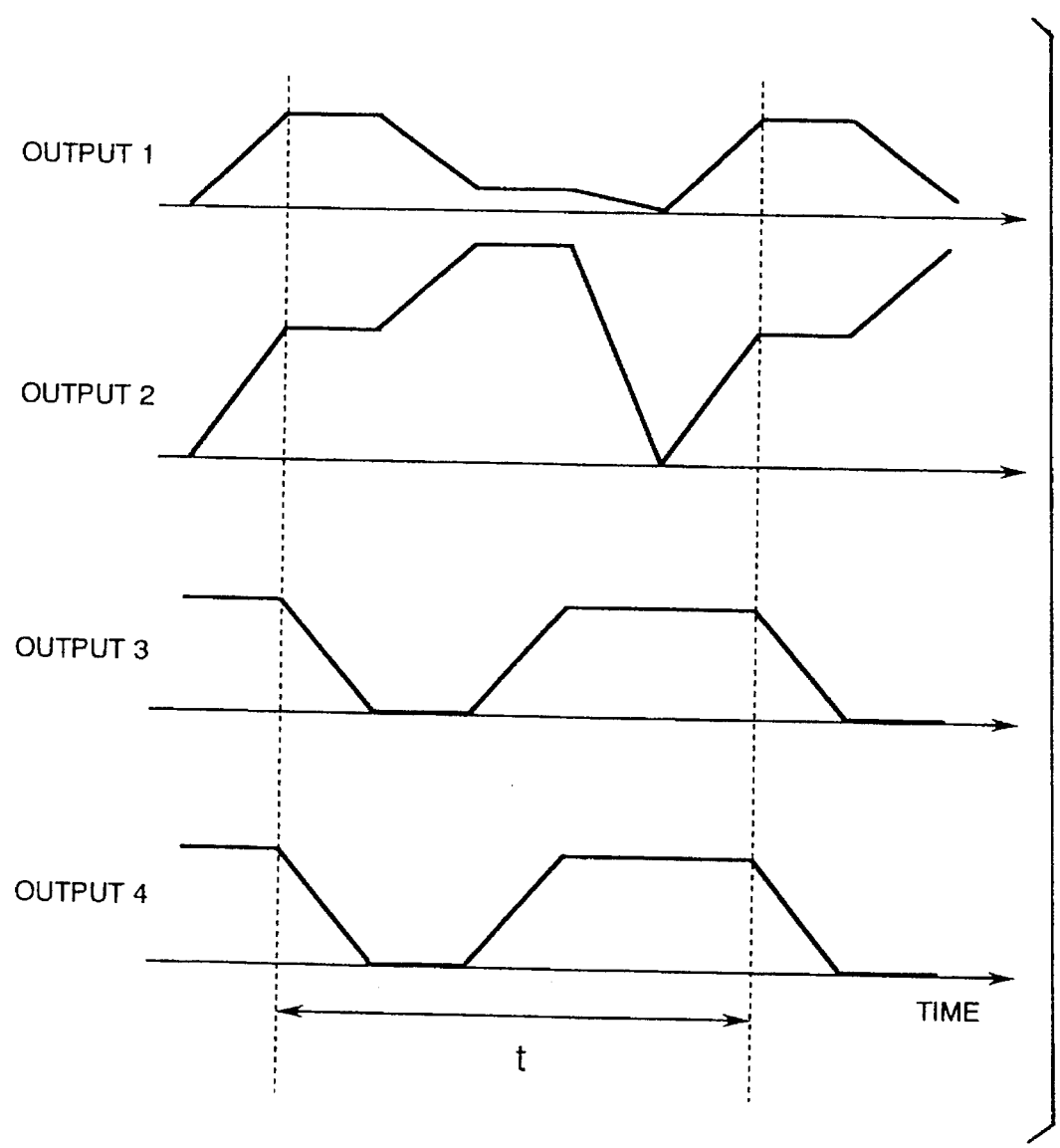
FIG. 7 shows still another example of a voltage waveform which is applied to a piezo electric device so as to drive the actuator of the present invention.

FIG. 7 shows an example of drive voltages which are used when precision is required. The pairs of piezo electric devices on the lower side are not used for driving, but and only the pairs of piezo electric devices on the upper side are used for driving. Even if there are differences in the drive characteristics between the piezo electric devices on the upper and lower sides due to variations in the piezo electric devices and variations in the gap between each drive head 3 and the driving rod 110, the stage 20 can be driven with high precision. However, the driving speed is half that of the embodiment shown in FIG. 5.

Figure 8:
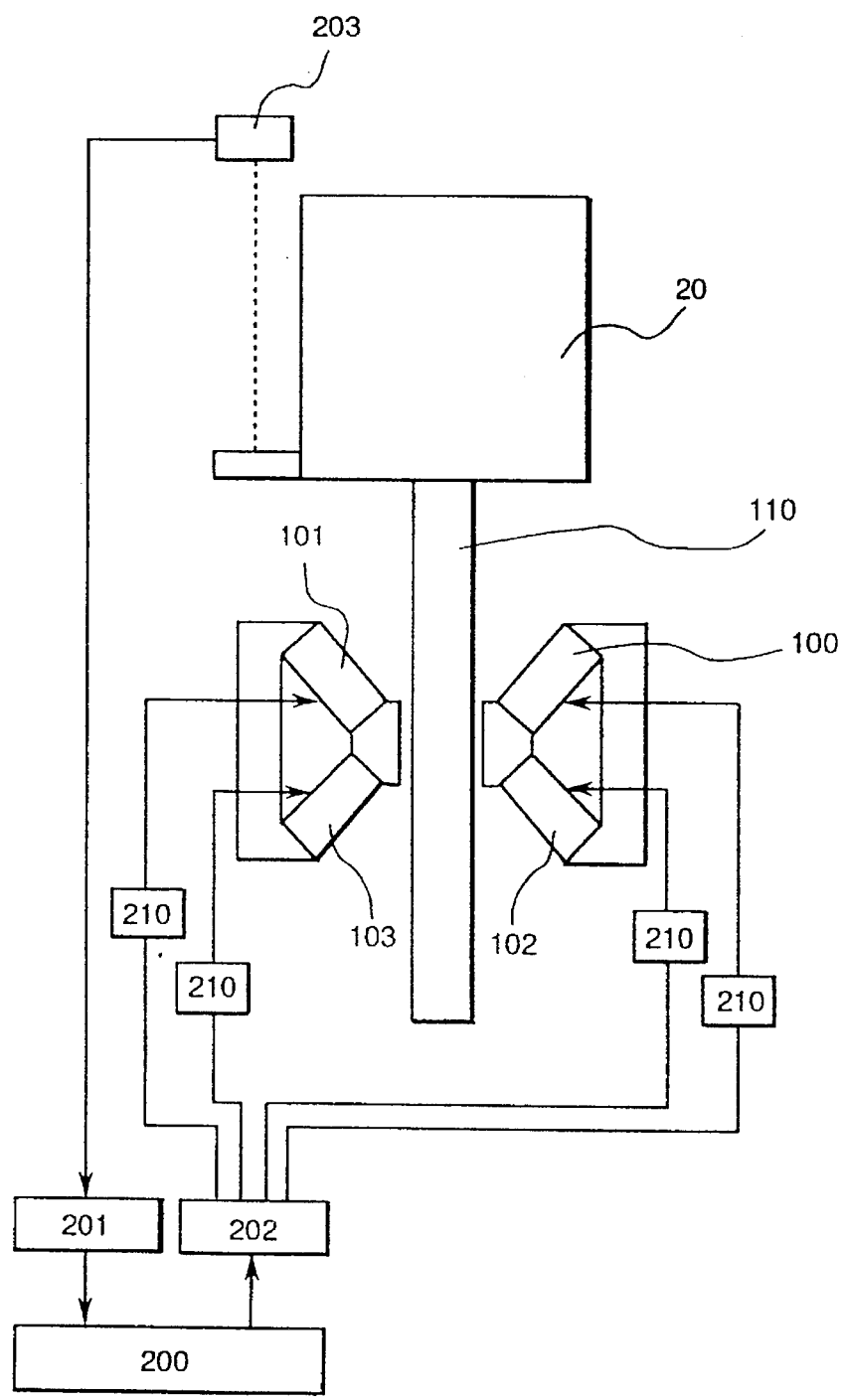
FIG. 8 shows an embodiment of a system configuration for driving the actuator of the present invention.

FIG. 8 shows an embodiment of a system configuration for driving the actuator of the present invention. To correct differences in the voltage-stretch characteristics between the piezo electric devices 100 to 103, a proportional resistance divider 210 is installed between each of the above piezo electric devices and a D-A converter 202. An electronic computer 200 selects a suitable drive waveform and drive period on the basis of the result which is obtained by measuring the position of the stage 20 by a position detector 203, and sends a signal to the D-A converter 202. In this embodiment, the stage is driven. However, the present invention may be used to drive a scanning tunneling microscope (STM) tip.

As explained above, according to the present invention, the stage can be driven at an optional speed between high speed and low speed with submicron accuracy, so that coarse motion and micromotion can both be performed by the same mechanism. As a result, a high speed and high precision positioning apparatus can be miniaturized and production cost can be reduced. The materials constituting the actuator of the present invention affect the vacuum little, even in a limiting environment such as an ultra-high vacuum. Therefore, the present invention is effective in miniaturization of an STM tip approach mechanism which is mainly used under vacuum, a specimen stage drive mechanism for electron beam lithography, and the transfer mechanism of a semiconductor device manufacturing apparatus.

What is claimed is:

1. An actuator comprising:

a stage formed on a base;

a driving rod on said base in contact with the stage and which transfers together with the stage;

a drive head for contact-driving said driving rod; and piezo electric devices fixed to said drive head, wherein said drive head and said driving rod are separated by a gap when no driving voltage is applied to said piezo electric devices.

2. An actuator according to claim 1, wherein said piezo electric devices have different stretch directions respectively on the plane containing the driving direction and the normal line at the contact point of said body and said drive head.

3. An actuator according to claim 1, wherein when the smaller of the angles between the normal line and the stretch directions of said piezo electric devices at the contact point of said body and said drive head is θ, said gap is about (cos θ)/2 of the maximum stretch of the piezo electric device having the angle θ when no voltage is applied to any of the piezo electric devices.

4. An actuator according to claim 1, wherein a maximum period of the voltage generated by the voltage generating means is determined by the resonance frequency of the piezo electric devices.

5. An actuator according to claim 2, wherein the angles between the stretch directions of said piezo electric devices and the normal line at the contact point of said body and said drive head are almost +45° and −45° respectively.

6. An actuator according to claim 1, wherein there are at least three of said piezo electric devices.

7. An actuator according to claim 1, further comprising:

means for applying driving voltages to said piezo electric devices; and voltage adjusting means for adjusting the absolute values of the driving voltages applied to said piezo electric devices independently for each of said piezo electric devices.

8. An actuator according to claim 7, wherein said voltage adjusting means comprises a position detector for measuring the position of said stage, an electronic computer for selecting a drive waveform and drive period on the basis of the position measured by the position detector, and a plurality of proportional resistance dividers for receiving the selected drive waveform and drive period from the electronic computer via a D-A converter, each of said proportional resistance dividers outputting a driving voltage to a different one of said piezo electric devices in response to said selected drive waveform and drive period.

9. An actuator comprising:

at least two piezo electric devices fixed on a base;

a drive head in contact with said piezo electric devices;

a body which is to be contact-driven by said drive head in a driving direction, said body and said drive head being separated by a gap when no voltage is applied to any of said piezo electric devices;

voltage generating means for generating a voltage for driving at least one Of said piezo electric devices to cause said drive head to contact and move said body in the driving direction, said voltage being directly proportional to the distance of movement of said body in the driving direction; and means for modifying the voltage to vary at a voltage amplitude variation speed proportional to a moving velocity of said body.

10. An actuator comprising:

first and second piezo electric devices fixed on a base;

a drive head in contact with said first and second piezo electric devices;

a body which is to be contact-driven by said drive head in a driving direction, said body and said drive head being separated by a gap when no voltage is applied to any of said piezo electric devices;

voltage generating means for generating a voltage for driving at least one of said piezo electric devices to cause said drive head to contact and move said body in the driving direction, said voltage being directly proportional to the distance of movement of said body in the driving direction; and means for modifying the voltage to vary at a voltage amplitude variation speed proportional to a moving velocity of said body.

11. An actuator comprising:

a body to be driven:

a drive head for contact-driving said body in a driving direction:

first and second piezo electric devices which are fixed to said drive head and have different stretch directions respectively on the plane containing the driving direction and the normal line at the contact point of said driven body and said drive head, said body and said drive head being separated by a gap when no voltage is applied to either of said first and second piezo electric devices;

voltage generating means for generating a voltage for driving at least one of said piezo electric devices to cause said drive head to contact add move said body in the driving direction, said voltage being directly proportional to the distance of movement of said body in the driving direction; and means for modifying the voltage to vary at a voltage amplitude variation speed proportional to a moving velocity of said body.

12. An actuator comprising:

at least two piezo electric devices fixed on a base;

a body which is to be contact-driven in a driving direction;

driving means for contact-driving said body in the driving direction, wherein said body and said driving means do not contact each other when no driving voltage is applied to said piezo electric devices;

voltage generating means for generating a voltage for driving at least one of said piezo electric devices to cause said driving means to move said body in the driving direction, said voltage being directly proportional to the distance of movement of said body in the driving direction; and means for modifying the voltage to vary at a voltage amplitude variation speed proportional to a moving velocity of said body.

13. An actuator according to claim 12, wherein said driving means includes a drive head for directly contact-driving said body, and wherein said piezo electric devices have different stretch directions respectively on the plane containing the driving direction and the normal line at the contact point of said body and said drive head.

14. An actuator according to claim 12, wherein when the smaller of the angles between the normal line and the stretch directions of said piezo electric devices at the contact point of said body and said drive head is θ, said gap is about (cos θ)/2 of the maximum stretch of the piezo electric device having the angle θ when no voltage is applied to any of the piezo electric devices.

15. An actuator according to claim 12, wherein a maximum period of the voltage generated by the voltage generating means is determined by the resonance frequency of the piezo electric devices.

16. An actuator according to claim 13, wherein the angles between the stretch directions of said piezo electric devices and the normal line at the contact point of said body and said drive head are almost +45° and −45° respectively.

* * * * *